United States Patent [19]
Axtell

[11] Patent Number: 5,452,607
[45] Date of Patent: Sep. 26, 1995

[54] DRIVE ON ROLLER BRAKE DYNAMOMETER SHUTTLE SYSTEM, TRAILER AND METHOD OF USING SAME

[75] Inventor: Dwight A. Axtell, Ankeny, Iowa

[73] Assignee: Hicklin Engineering, Inc., Des Moines, Iowa

[21] Appl. No.: 281,486

[22] Filed: Jul. 27, 1994

[51] Int. Cl.$^6$ ........................................ G01L 5/28
[52] U.S. Cl. ............................ 73/121; 73/122; 73/123
[58] Field of Search ........................ 73/121, 122, 123, 73/124; 414/563; 180/53.1

[56] References Cited

U.S. PATENT DOCUMENTS

| | | | |
|---|---|---|---|
| 1,155,126 | 9/1915 | Bond. | |
| 2,144,010 | 10/1939 | Bennett | 73/123 |
| 2,185,246 | 1/1940 | Cunningham | 73/51 |
| 2,374,383 | 4/1945 | Sampsell | 214/85 |
| 2,478,795 | 8/1949 | Whalen et al. | 280/43 |
| 2,589,948 | 3/1952 | Marshall | 214/65 |
| 2,922,534 | 1/1960 | Vodraska et al. | 214/75 |
| 3,277,702 | 10/1966 | Brenneke | 73/117 |
| 3,491,587 | 1/1970 | Morris et al. | 73/117 |
| 3,692,081 | 9/1972 | May et al. | 157/13 |
| 3,993,115 | 11/1976 | Greene et al. | 157/13 |
| 4,012,973 | 3/1977 | Tupper | 82/82 |
| 4,044,609 | 8/1977 | Asmus | 73/117 |
| 4,273,351 | 6/1981 | Salamander | 280/414 R |
| 4,365,923 | 12/1982 | Lubbers | 414/483 |
| 4,504,351 | 3/1985 | Antonson | 156/391 |
| 4,708,066 | 11/1987 | Heckman | 105/215.2 |
| 4,912,970 | 4/1990 | Gicewicz | 73/122 |
| 5,135,601 | 8/1992 | Klose et al. | 156/406.4 |
| 5,148,703 | 9/1992 | Vaughan et al. | 73/123 |

Primary Examiner—Richard E. Chilcot, Jr.
Assistant Examiner—Max H. Noori
Attorney, Agent, or Firm—Zarley, McKee, Thomte, Voorhees & Sease

[57] ABSTRACT

A roller brake dynamometer includes shuttle wheels which engage the dynamometer rollers and are movable between raised and lowered ground engaging positions. The shuttle wheels may be rotated in the same or opposite directions to move the dynamometer forwardly, rearwardly or turn it about its own axis. A dynamometer transport trailer includes an endless conveyor chain running the length of the center of the tiltable trailer bed which includes a tongue engagable with the dynamometer frame for pulling the dynamometer on to and off of the trailer bed.

19 Claims, 7 Drawing Sheets

DRIVE ON ROLLER BRAKE DYNAMOMETER SHUTTLE SYSTEM, TRAILER AND METHOD OF USING SAME

BACKGROUND OF THE INVENTION

A vehicle brake testing dynamometer which is portable presents a problem at the location of use as to positioning the dynamometer on the road surface such that vehicles can be driven onto it for brake testing. The length of the dynamometer corresponds generally to the width of the vehicle which will be driven onto it. The dynamometer when transported must be turned such that its longitudinal axis is parallel to the direction of travel to minimize its width and allow it to be hauled on a trailer. The dynamometer normally does not carry its own transport wheels as it needs to sit solidly on the ground when being used to test truck brakes.

Thus, among the problems to which this invention is directed is that of loading and unloading the dynamometer on a trailer and when at a brake testing location the positioning of the dynamometer so that trucks may be driven onto it for brake testing.

The patent to Vaughn, et al. 5,148,703, Sep. 22, 1992, discloses a vehicle inspection trailer wherein the trailer wheel system is pivotable between a transport trailer position to a brake testing position where the dynamometer is on the ground and the trailer wheels are pivoted out of the way. This system combines the dynamometer and trailer into a single unit but has no means of turning the dynamometer once placed on the ground so that it is transverse to the roadway and is in a position for trucks to drive onto it. My invention provides a system which meets these needs.

SUMMARY OF THE INVENTION

This invention involves a drive on roller brake dynamometer, a trailer for loading and unloading and the method of use. The dynamometer has shuttle wheels which are adapted to be raised and lowered at each end of the dynamometer. The shuttle wheels may be driven forwardly, rearwardly or in opposite directions to pivot and position the dynamometer as desired. The shuttle wheels are in continuous engagement with the dynamometer rollers and thus rotate freely when raised and engage the ground when lowered to move the dynamometer as desired. Bi-directional controls for the rollers effect the three positioning movements.

The trailer for transporting the dynamometer has a bed which tilts to position the rear end on the ground for loading and unloading. An endless chain extends around sprockets at the front and rear ends of the bed and includes a tongue which extends from the chain to an end of the dynamometer for pulling the dynamometer on and off the tilted bed. The chain is positioned in the top surface of the bed and the dynamometer frame slides along the trailer bed frame when being loaded and unloaded.

The method of use of the trailer and shuttle system includes positioning the dynamometer lengthwise on the trailer by pulling it onto the trailer bed through use of the tongue connected to the chain in the bed of the trailer. When the test site has been reached, the bed is tilted downwardly at the rear and the conveyor chain on the bed is operated in the opposite direction to pull the dynamometer off the bed and onto the ground. When the dynamometer is free of the trailer the rollers are operated which in turn drive the shuttle wheels. A power cylinder is operated to pivot the shuttle wheels into ground engagement thereby allowing the dynamometer to be moved forwardly, rearwardly or rotated by operating the shuttle wheels at each end of the dynamometer in opposite directions. Ordinarily the dynamometer will be rotated one quarter turn to position it transversely of the roadbed thereby allowing vehicles to be driven onto it. When the dynamometer is to be transported again, the step by step process is reversed wherein the shuttle wheels are again lowered into engagement with the ground and then the rollers are operated to position the dynamometer parallel to the direction of travel and at the rear of the trailer. The tongue on the trailer bed conveyor chain is connected to the dynamometer frame and the conveyor chain is operated to pull the dynamometer onto the bed of the trailer whereupon it is tilted to the raised horizontal position making it ready for being transported. The hydraulic power system of the dynamometer is connected via quick-couplers to power the chain drive motor.

DESCRIPTION OF THE PREFERRED EMBODIMENT

Figure 1:
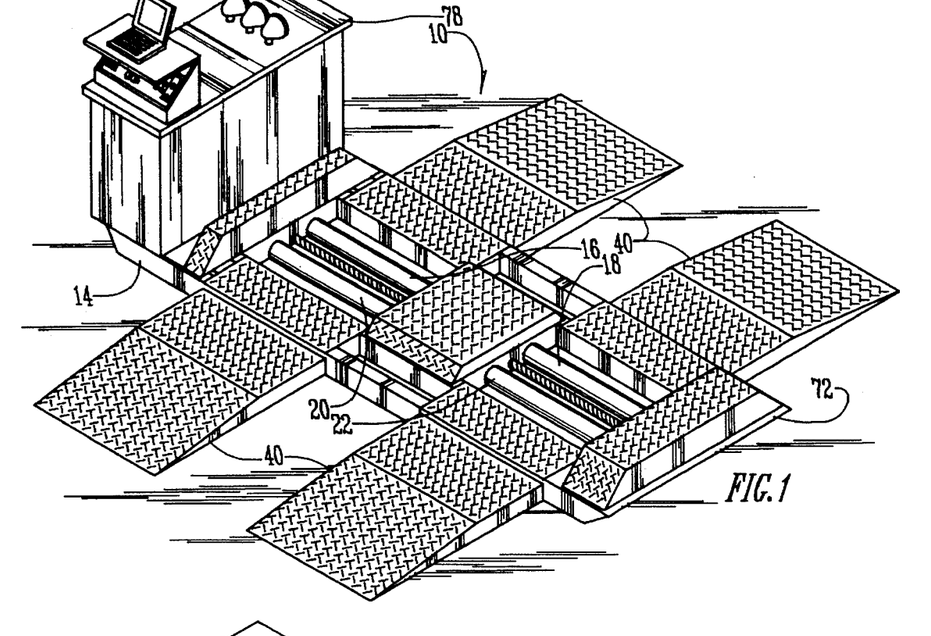
FIG. 1 is a perspective view of the roller brake dynamometer in its position ready for a truck to be driven onto it for testing the truck brakes.
Figure 2:
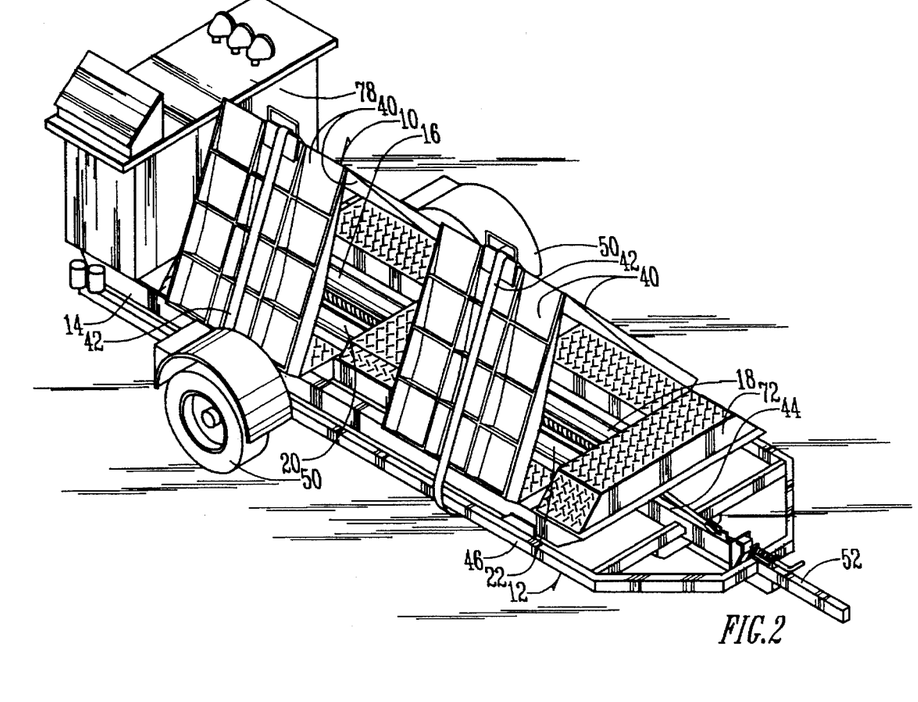
FIG. 2 is a perspective view showing the dynamometer on a trailer to be used for transporting the dynamometer between vehicle brake test locations.

The roller brake dynamometer of this invention is referred to generally in FIG. 1 by the reference numeral 10 and is shown in FIG. 2 loaded on a trailer 12 for hauling between truck brake testing sites.

The dynamometer 10 includes an elongated frame 14 having first and second wheel engaging rollers 16 and 18 spaced apart in end to end relationship for engagement with wheels at opposite ends of a common truck axle. A second set of rollers 20 and 22 are also in end to end relationship and spaced from the first set of rollers 16 and 18 to also engage the truck wheels such that one wheel is engaged by rollers 16 and 20 and the other wheel is engaged by rollers 18 and 22. Hydraulic motors 24 rotate the rollers which have knurled surfaces for engaging the truck tires.

Figure 5:
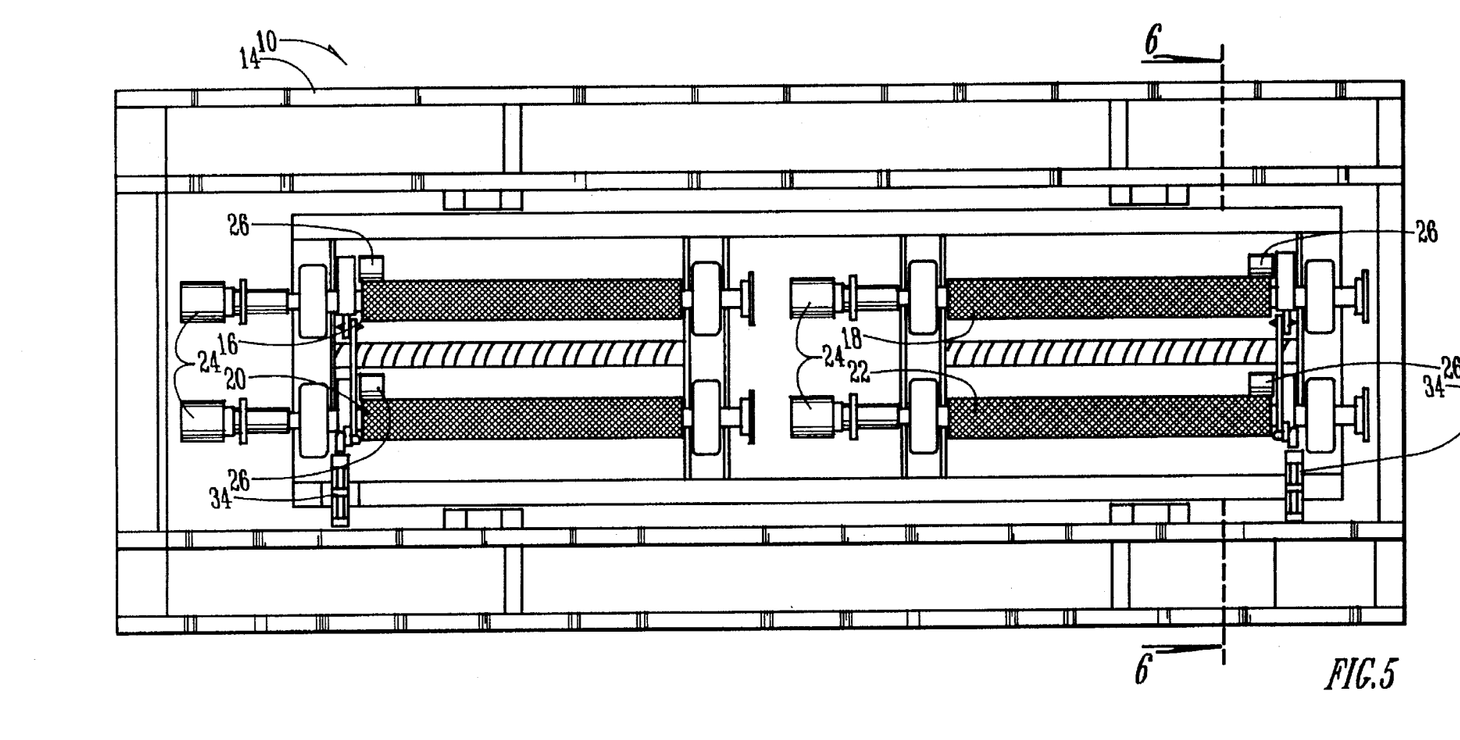
FIG. 5 is a partial top plan view of the dynamometer.
Figure 6:
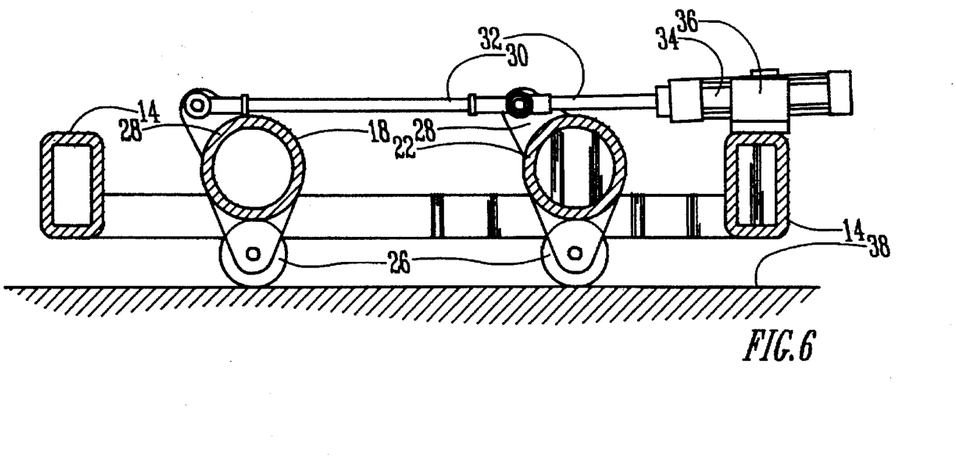
FIG. 6 is a cross sectional view taken along line 6—6 in FIG. 5 showing the dynamometer in its raised position with the shuttle wheels engaging the ground.
Figure 7:
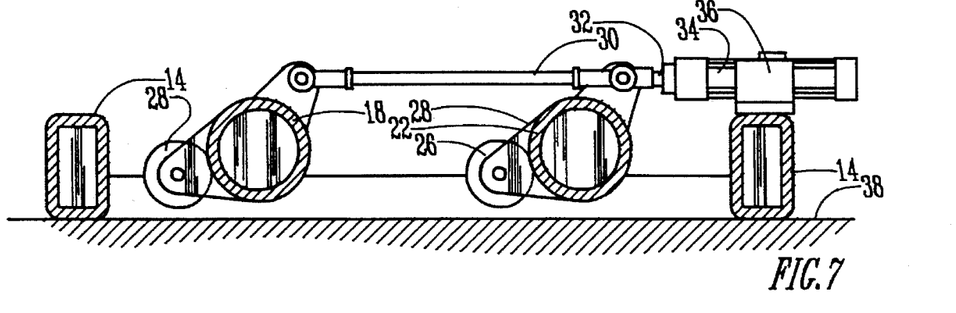
FIG. 7 is a view similar to FIG. 6 but showing the dynamometer lowered onto the ground with the shuttle wheels raised off of the ground.

The shuttle wheel system is shown in FIGS. 5–7 and includes a shuttle wheel 26 associated with each roller. The shuttle wheels 26 are carried on the lower ends of arms 28 which pivot about an axis common to the longitudinal axis of rotation of the rollers. The ends of the arms 28 opposite the wheels 26 are engaged by an actuation rod 30 which interconnects side by side arms 28 and in turn is connected to a rod 32 connected to a power cylinder 34 pivotally mounted through a hinge bracket 36 to the frame 14. It is seen in FIGS. 5–7 that the shuttle wheels 26 continuously engage the knurled rollers and thus the shuttle wheels rotate whenever the rollers are rotating. When the dynamometer frame 14 is resting on the ground, as is the case when it is being used to test vehicle wheel brakes, the shuttle wheels 26 are raised off the ground and rotate freely as the rollers rotate when driving the vehicle wheels. Operation of the power cylinder 34 as seen in FIG. 6, pivots the shuttle wheels lifting the machine frame off the ground so that the entire frame is by its rollers resting on the shuttle wheels, thereby allowing further rotation of the rollers to drive the shuttle wheels 26 and cause the dynamometer to move forwardly or rearwardly or rotate about its own center axis if the rollers 18 and 22 are driven in opposite directions from the rollers 16 and 20 at the opposite end.

When it is desired to move the dynamometer 10 to another test location, the oppositely disposed set of ramps 40 associated with each set of rollers are folded upwardly to the position of FIG. 2 and held in this position by a strap 42.

The loading of the dynamometer 10 onto the trailer 12 is done in a reversed step by step procedure from the unloading as illustrated in FIGS. 9–16 which will be described later.

Figure 3:
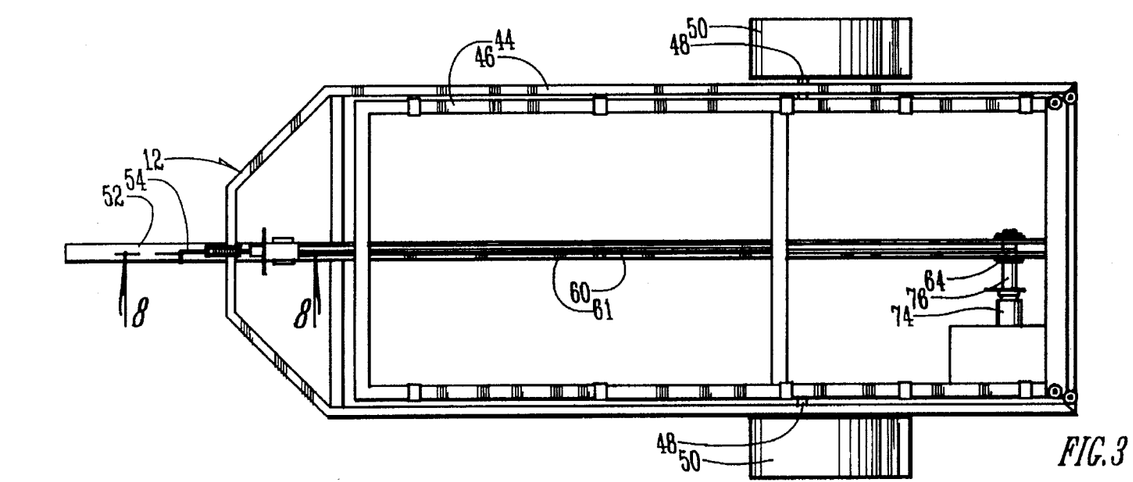
FIG. 3 is a top plan view of the trailer.
Figure 4:
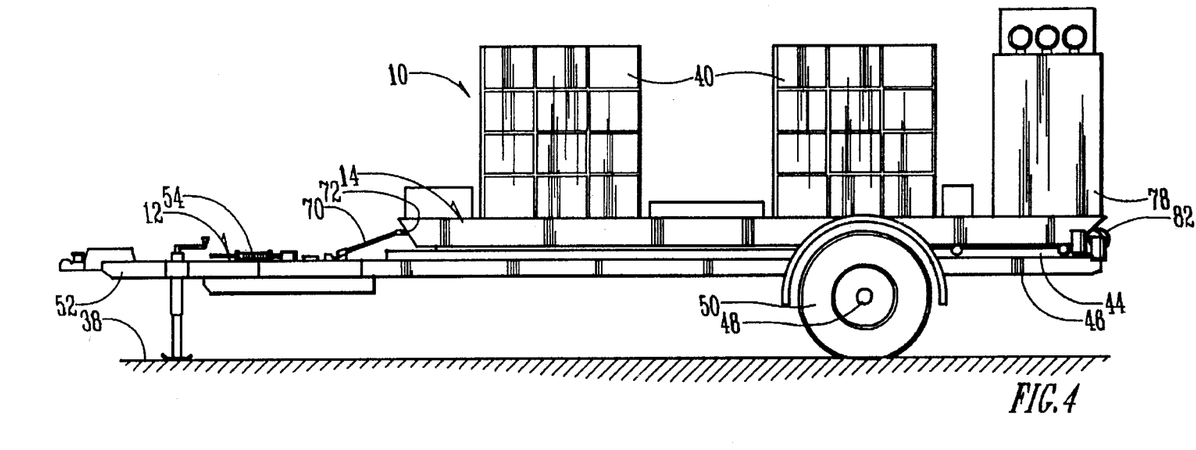
FIG. 4 is a side elevation view thereof with the dynamometer on the trailer.
Figure 8:
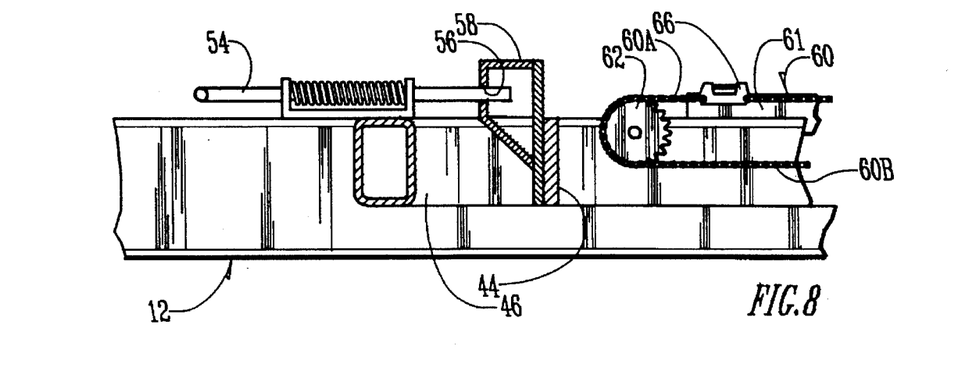
FIG. 8 is a cross sectional view taken along line 8—8 in FIG. 3 showing the conveyor chain on the bed of the trailer and the lock pin for holding the trailer bed in a raised position.

The trailer 12 is best shown in FIGS. 3, 4 and 8 and includes a bed frame 44 pivoted to a trailer frame 46 about an axis 48. The trailer frame 46 is carried on wheels 50 and includes a trailer tongue 52. A spring loaded pin 54 mounted on the trailer frame 46 engages an opening 56 in an upstanding member 58 on the forward end of the bed frame 44 to hold the bed frame in a horizontal raised position.

An endless conveyor chain 60 extends along a rail 61 lengthwise of the trailer bed frame 44 along the longitudinal center and engages sprockets 62 and 64 at the front and rear ends respectively of the rail 61. The chain 60 includes a top section 60A and a bottom section 60B. The top chain section 60A includes a connecting link 66 adapted to engage the forward end of a tongue member 70 having its rear end in engagement with the forward end 72 of the dynamometer frame 14 as seen in FIG. 4. A hydraulic motor 74 is located on the bed frame 44 as seen in FIG. 3 and powers the endless conveyor chain 60 through a shaft 76.

Figure 15:
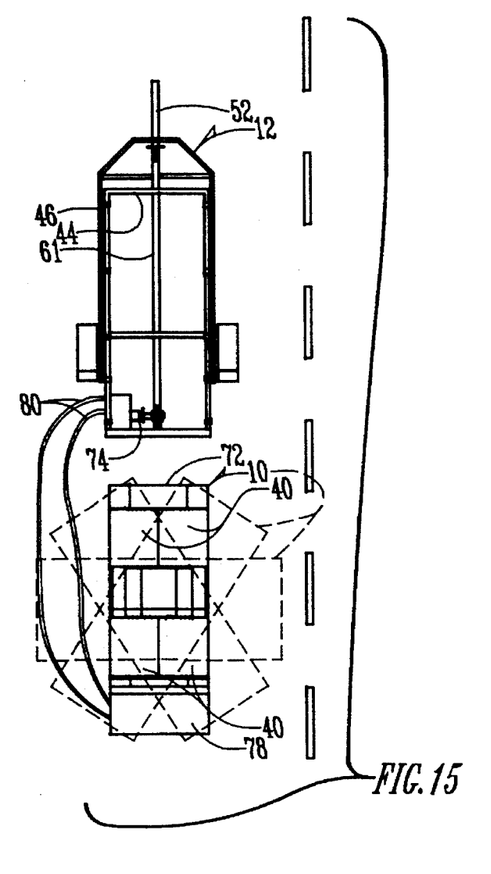
FIG. 15 illustrates the dynamometer unloaded onto the ground and being rotated a quarter turn for being positioned to allow a truck to be driven on a single lane of a road.

A control console 78 is positioned at one end of the dynamometer 10 and includes an engine (not shown) for driving a hydraulic pump in turn connected by the lines 80 as seen in FIG. 15 to the hydraulic motor 74 on the trailer 12.

Figure 9:
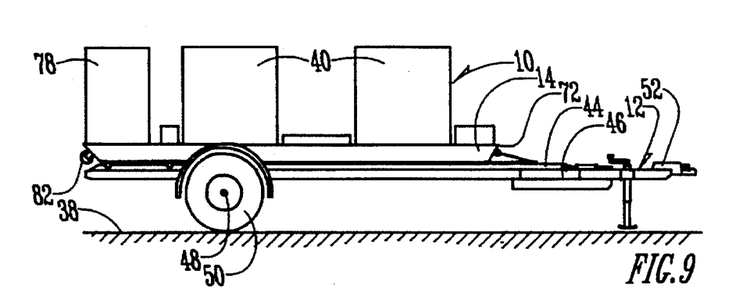
FIGS. 9–14 are side elevational views showing the dynamometer and step-by-step positions between being loaded on the trailer and unloaded onto the ground.
Figure 10:
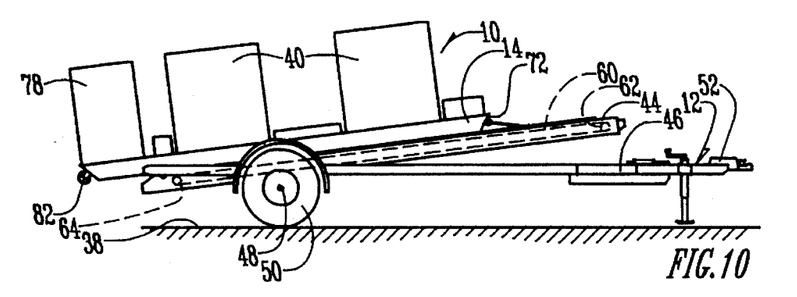
Figure 11:
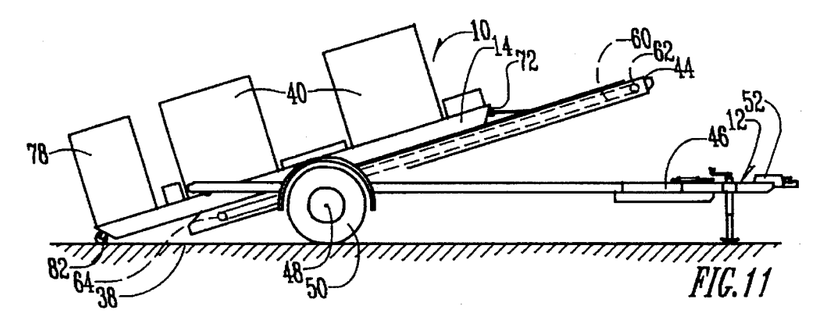
Figure 12:
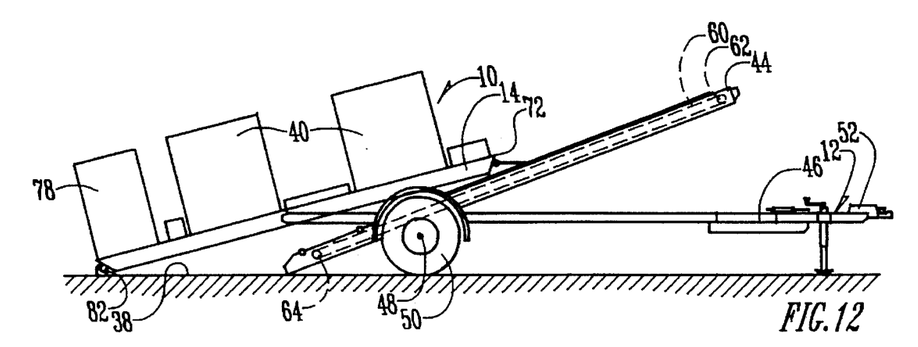
Figure 13:
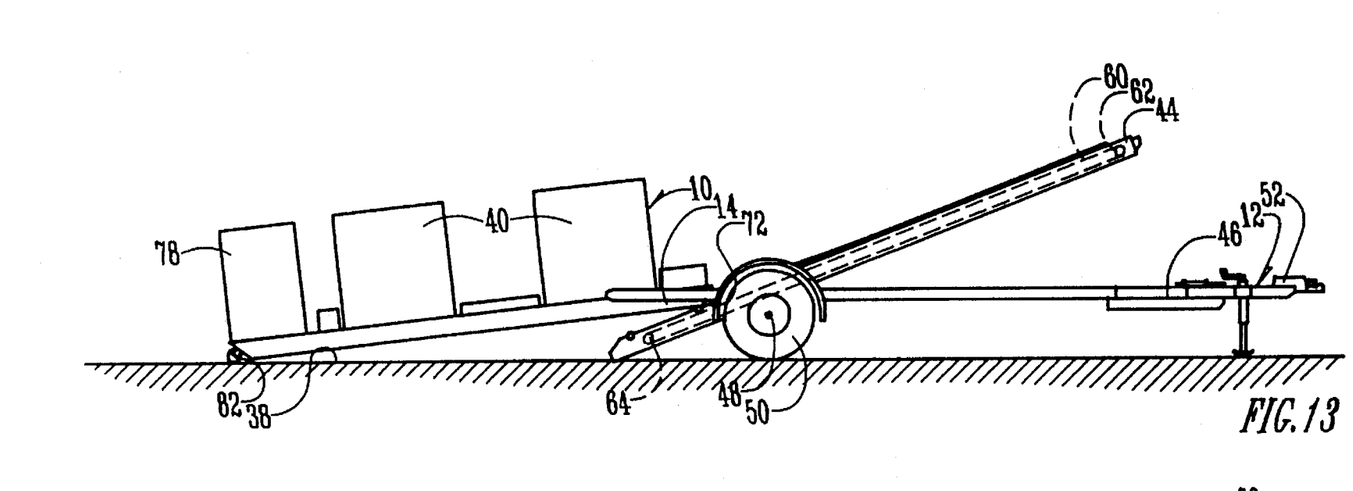
Figure 14:
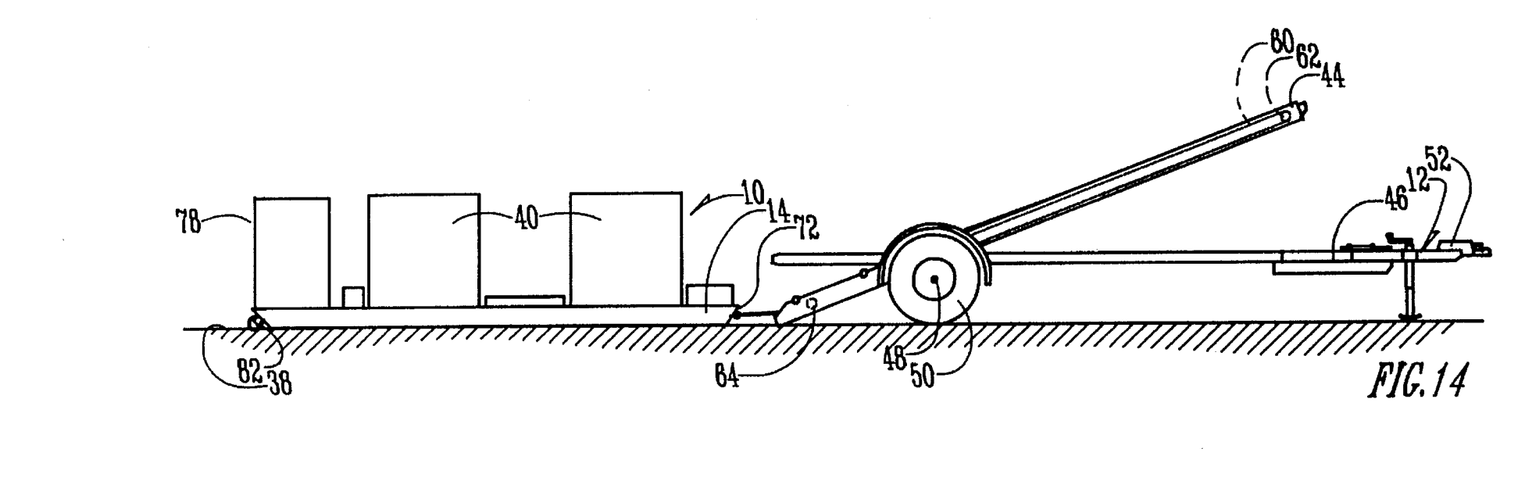

The unloading of the dynamometer 10 as shown in FIGS. 9–16 starts with the dynamometer on the trailer as seen in FIG. 9 in a transport position. The trailer bed frame 44 is first pivoted to its down position as seen in FIG. 10 by releasing the pin 54 and moving dynamometer slightly rearward. A motion dampening cylinder attached to bed frame and trailer frame controls pivoting speed seen in FIG. 4. Next, the conveying chain 60 is operated rearwardly to push the dynamometer 10 off the trailer bed frame 44 through pressure applied through the tongue 70 as seen in FIGS. 11–14. A roller 82 at the rear end of the dynamometer 10 engages the ground 38 first and raises the dynamometer off the trailer bed frame 44 as seen in FIGS. 11 and 12. Continued rearward movement of the conveyor chain 60 moves the dynamometer 10 totally onto the ground as seen in FIG. 14 at which time the tongue 70 and hydraulic lines may be disconnected from the dynamometer allowing the trailer 12 to be moved out of the way.

Figure 16:
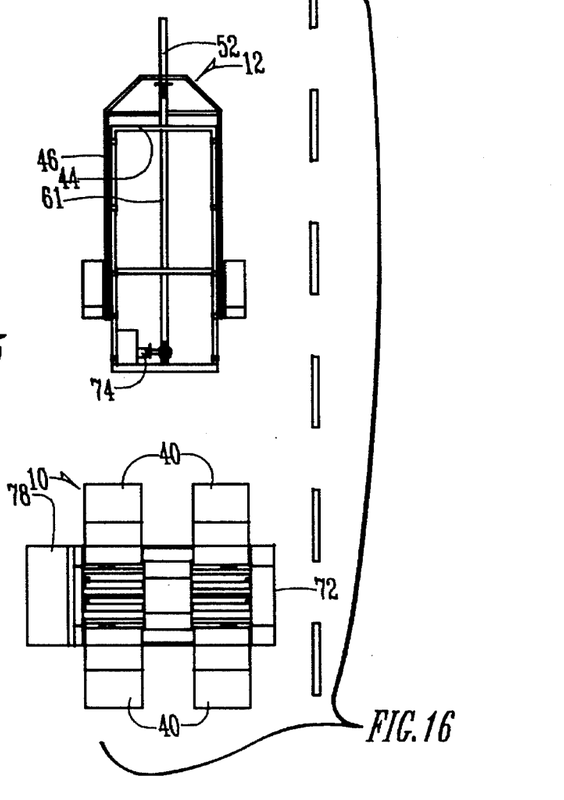
FIG. 16 is a view similar to FIG. 15 but showing the unloading and positioning steps completed with the dynamometer ready for testing vehicle brakes and the trailer being ready to be pulled out of the way.

As seen in FIGS. 15 and 16, the loading and unloading operation is seen on a single lane road bed and the dynamometer 10 is now rotated one quarter turn between the solid line position in FIG. 15 to the transverse dash line position wherein it is ready to receive vehicles for brake testing purposes. In FIG. 16 the unloading operation is complete and the dynamometer 10 is ready to be operated to test vehicle brakes and the trailer 12 is ready to be moved away. When the testing operation has been completed, the reverse procedure may be followed for loading the dynamometer 10 back onto the trailer 12 for being moved to the next test site.

What is claimed is:

1. A drive on roller brake dynamometer shuttle system comprising, a frame having first and second vehicle wheel engaging rollers spaced apart in end to end parallel relationship, a first power means for rotating said rollers, a shuttle wheel engaging each of said rollers for rotation with said rollers, and a second power means for moving said shuttle wheels into and out of engagement with the ground for lifting and moving said dynamometer over the ground.

2. The dynamometer of claim 1 wherein said first power means functions to rotate said rollers either clockwise or counter clockwise for moving said dynamometer forwardly or rearwardly.

3. The dynamometer of claim 2 wherein said first power means functions to rotate one of said rollers in one direction and the other of said rollers in the opposite direction for rotating said dynamometer about its vertical axis.

4. The dynamometer of claim 1 and third and fourth vehicle wheel engaging rollers are spaced apart in end to end parallel relationship and are positioned for said first and third rollers to engage one vehicle wheel and said second and fourth rollers to engage another vehicle wheel on a common axle with said one wheel.

5. The dynamometer of claim 4 and said first power means functions to rotate said first and third rollers together in the same direction and said second and fourth rollers together in a direction common to each of them.

6. The dynamometer of claim 1 and said rollers are knurled for engagement with said shuttle wheels and vehicle wheels.

7. The dynamometer of claim 5 and a shuttle wheel engages each of said third and fourth rollers.

8. The dynamometer of claim 7 and each of said rollers includes a longitudinal axis of rotation and an arm is associated with each roller to pivot about the axis of rotation, said arm having an upper and lower end, said shuttle wheel being mounted on the lower end and an actuating rod connected to the upper end, said actuating rod being connected to said second power means for pivoting said shuttle wheel between raised and lowered positions with said wheel engaging the ground in said lowered position.

9. The dynamometer of claim 8 and said second power means is a power cylinder mounted on said frame.

10. The dynamometer of claim 9 and said actuating rod being one of two actuating rods connected to one of two power cylinders, one of said actuating rods extends between said arms associated with said first and third rollers and is connected to one of said power cylinders and said second actuating rod extends between said arms associated with said second and fourth rollers and is connected to the other of said power cylinders.

11. A trailer for a drive on roller dynamometer comprising
   a pivotal bed mounted on a frame having wheels, said bed being pivotal between raised and lowered positions,
   an closed loop chain extending around front and rear mounted sprockets on said bed,
   power means for moving said chain in opposite directions, and
   a tongue connected to said chain for being connected to a dynamometer for pushing said dynamometer off said trailer and pulling it onto said trailer when said bed is in said lowered position.

12. The trailer of claim 11 wherein said bed includes front and rear ends and opposite sides and a rail extending longitudinally between said front and rear ends centered between said opposite sides, and said endless chain having sections extending over and through said rail with said sprockets being on said rail at the front and rear ends of said bed.

13. The trailer of claim 12 and said top section of said chain includes said tongue and said top section of said chain is closely adjacent the top surface of said bed.

14. The method of loading, transporting, unloading and positioning for use a roller brake dynamometer comprising the steps of,
   pulling the dynamometer end wise onto a trailer bed tilted at its rear end to the ground,
   transporting the dynamometer on the trailer to a location for testing vehicle brakes,
   unloading the dynamometer from the trailer by operating a pulling means on the trailer to pull the dynamometer, tilting the rear end to the ground and moving the trailer onto the ground, and
   turning the dynamometer ninety degrees to position the dynamometer to allow vehicles to drive onto it.

15. The method of claim 14 and the step of turning the dynamometer includes operation of powered ground engaging wheels at opposite ends of the dynamometer which are operable to rotate in opposite directions to cause the dynamometer to rotate at any angle about its vertical axis.

16. The method of claim 14 wherein the steps of unloading and loading the dynamometer include operating an closed loop chain in the bed of the trailer having a tongue connected between the dynamometer and the chain for pushing and pulling said dynamometer along the trailer bed.

17. A drive on roller brake dynamometer shuttle system comprising,
   a frame having first and second vehicle wheel engaging rollers spaced apart in end to end parallel relationship,
   a first power means for rotating said rollers,
   a shuttle wheel at opposite ends of said frame, and
   a second power means for rotating said shuttle wheels in opposite directions to turn said dynamometer to position it for use or to be loaded onto a trailer.

18. The dynamometer of claim 17 and said second power means is said first and second wheel engaging rollers which directly engage said shuttle wheels to cause their rotation.

19. The dynamometer of claim 18 and a third power means is provided for moving said shuttle wheels between raised and lowered positions thereby lifting the dynamometer with said wheels being lowered when said dynamometer is being positioned for use or loading on a trailer.

* * * * *